United States Patent [19]

Jackson

[11] 4,125,103

[45] Nov. 14, 1978

[54] BREAKERLESS IGNITION DISTRIBUTOR FOR INTERNAL COMBUSTION ENGINES

[76] Inventor: Charles D. Jackson, 349 W. Garfield, Glendale, Calif. 91204

[21] Appl. No.: 757,758

[22] Filed: Jan. 7, 1977

[51] Int. Cl.[2] ........................ F02P 5/00; H01H 19/60; F16D 5/00

[52] U.S. Cl. ........................ 123/146.5 A; 123/117 R; 64/25; 200/19 R

[58] Field of Search .................... 123/148 E, 146.5 A, 123/117 R, 148 F; 64/25; 200/19 R, 31 CA

[56] References Cited

U.S. PATENT DOCUMENTS

| | | | |
|---|---|---|---|
| 1,341,136 | 5/1920 | Kent | 123/117 R |
| 2,016,669 | 10/1935 | Davis, Jr. | 123/146.5 A |
| 3,482,559 | 12/1969 | Salomon | 123/117 R |
| 3,646,922 | 3/1972 | Spalding | 123/146.5 A |
| 3,923,028 | 12/1975 | Campbell et al. | 123/146.5 A |
| 3,958,543 | 5/1976 | Senda | 123/146.5 A |
| 4,037,577 | 7/1977 | Gallo | 123/146.5 A |

FOREIGN PATENT DOCUMENTS

| | | | |
|---|---|---|---|
| 473,363 | 10/1937 | United Kingdom | 200/19 R |

*Primary Examiner*—Charles J. Myhre
*Assistant Examiner*—P. S. Lall
*Attorney, Agent, or Firm*—Sellers and Brace

[57] ABSTRACT

A breakerless ignition distributor equipped with a pair of centrifugally responsive spark retarding discs sandwiched between a pair of bearing members all held assembled to the distributor shaft by a readily adjusted clutch. Centrifugally responsive balls held captive in sets of diverging slots in the two discs are urged by calibrated springs to their inner or retracted position. The centrifugally actuated disc has a ring of peripheral openings rotating across a light beam to activate a solid state ignition circuit and is effective to retard the spark during engine starting and to advance the spark thereafter. The distributor is quickly convertible for operation either clockwise or counterclockwise.

9 Claims, 3 Drawing Figures

BREAKERLESS IGNITION DISTRIBUTOR FOR INTERNAL COMBUSTION ENGINES

This invention relates to engine ignition control devices, and more particularly to an improved ignition distributor having a breakerless spark retarding mechanism of unique construction installable as original equipment or in place of a conventional breaker type distributor.

The many problems and shortcomings characterizing conventional breaker point type engine ignition systems are well known. A basic problem of convention ignition systems involves a design compromise between reasonable breaker point life and the current density the points can handle. By a generally accepted rule of thumb, the maximum current through the breaker points must be less than four amperes; otherwise serious problems involving maintenance, service life, poor starting and poor engine operating characteristics are unavoidable.

In recent years, advances in solid state electronic technology have led to the development and expanding use of breakerless electronic ignition systems. These systems completely eliminate adjustment of points and virtually all maintenance. These systems also eliminate the varying spark timing, losses due to arcing and pitting of the contacts and provide greater fuel economy, better starting, minimizing need for engine tuning and provide much longer spark plug life.

Various proposals have been made heretofore for breakerless electronic ignition systems some of which require specially constructed distributors while others involve kits for converting a distributor of conventional breaker point design to breakerless electronic ignition. However, breakerless ignition distributors heretofore designed are subject to various shortcomings and disadvantages avoided by the present invention owing to their complexity, cost, inadequate provision for adjustment, versatility and the like problems.

To avoid these difficulties, there is provided by this invention a simple, rugged, highly reliable, easily installed breakerless distributor utilizing solid state ignition components. The distributor spark control includes a pair of centrifugally responsive discs sandwiched between a pair of bearing discs, all held assembled about the outer end of the distributor shaft by a readily adjusted timing control and assembly fastener. The center pair of discs is formed with sets of overlapping slots inclined in opposite directions to the radius with each set seating a ball responsive to rotation of the distributor to rotate the ignition control or chopper disc in opposition to calibrated springs thereby to control retardation and advance of the spark during engine starting. The chopper disc has equally spaced openings distributed about its periphery positioned to rotate across a light beam to control sequential operation of the solid state ignition circuits. The chopper biasing springs may be of unequal strengths and effective to advance the spark non-linearly as the engine gathers speed in starting.

Accordingly, it is a primary object of this invention to provide an improved, rugged, inexpensive high-precision breakerless distributor for an internal combustion engine equally suitable for use with either clockwise or counterclockwise driven shafts.

Another object of the invention is the provision of unique assembly and timing adjustment means at the upper end of the distributor shaft readily accessible upon detachment of the distributor cap.

Another object of the invention is the provision of a breakerless ignition control distributor provided with a plurality of free balls held captive in slotted discs having their interface in a diametric plane common to all the balls.

Another object of the invention is the provision of an improved ignition distributor having centrifugally actuated breakerless spark advance and retard control components including a single movable chopper disc spring biased in opposition to centrifugally responsive ball actuators and wherein the spring bias is designed to permit spark control as a non-linear function of engine speed.

These and other more specific objects will appear upon reading the following specification and claims and upon considering in connection therewith the attached drawing to which they relate.

Referring now to the drawing in which a preferred embodiment of the invention is illustrated:

Figure 1:
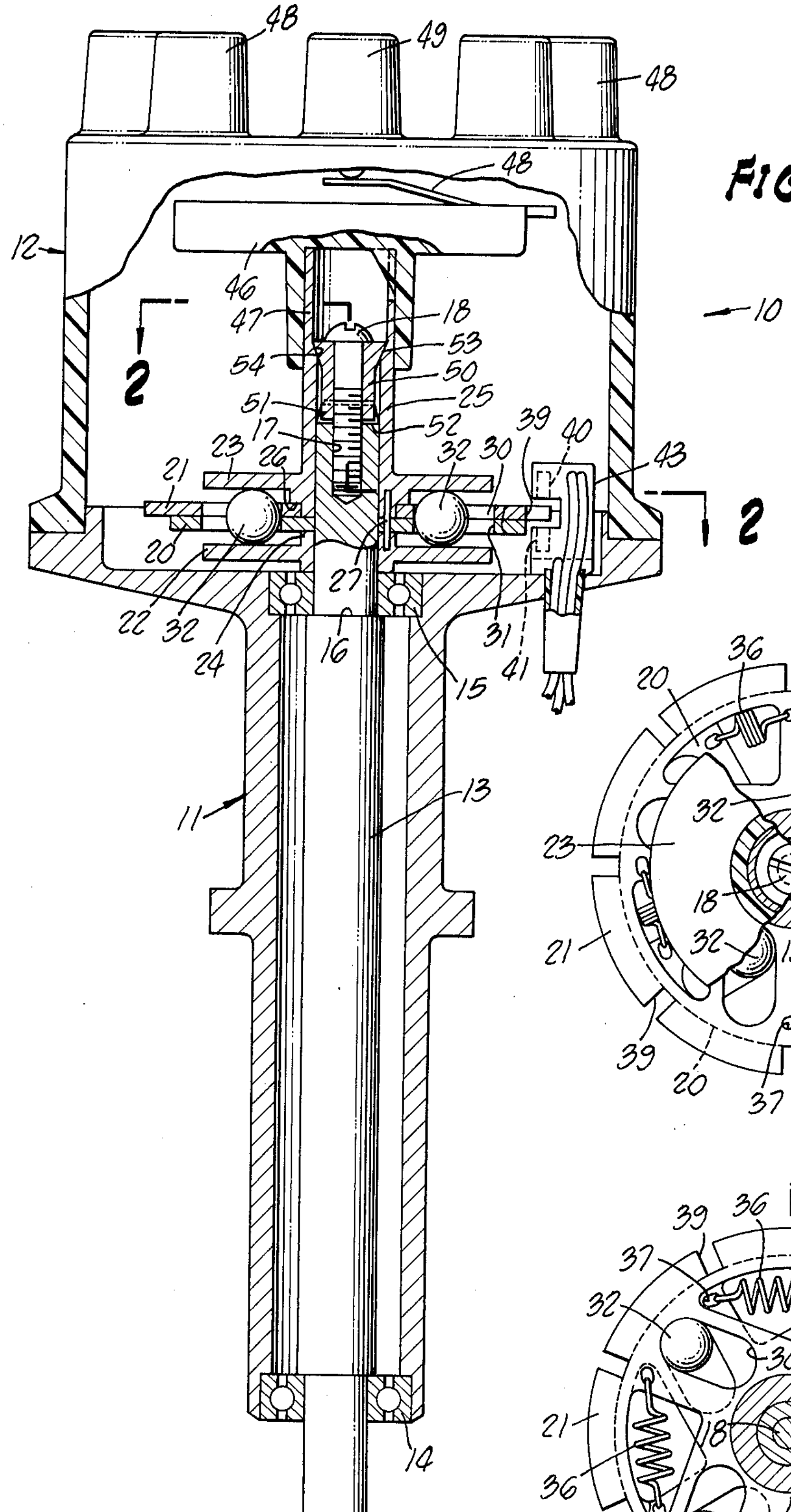
FIG. 1 is a side elevational view of a conventional distributor with parts broken away showing the invention breakerless ignition components installed therein.

Referring initially more particularly to FIG. 1, there is shown a conventional distributor assembly, designated generally 10, having a main housing 11 and a removable cap 12 of suitable non-conductive material. The distributor drive shaft 13 is suitably supported in ball bearing assemblies 14, 15 and its lower end is normally equipped in known manner with a helical drive gear, not shown, mateable with a drive gear secured to the engine cam shaft.

The upper end of distributor shaft 13 has an external shoulder 16 and an axial threaded well 17 seating an assembly screw 18 employed, as will be described presently, to hold the centrifugally actuated spark advance components assembled to shaft 13 in a desired ignition timing control position. The spark retarding and advance actuators include a stationary disc 20 and a chopper disc 21. These two discs are sandwiched between a pair of bearing discs 22 and 23 provided in their central portions with tubular collars with oppositely facing annular flanges 24, 25. The adjacent ends of collars 23, 25 bear against the adjacent faces of disc 20 to clamp this disc immovably to shaft 13 when the assembly screw 18 at the upper end of shaft 13 is tightened. Chopper disc 21 has a free rotational fit about both the outer periphery of collar 25 and the radial face 26 of collar 25. Discs 20, 22 and 23 are held locked together and against rotation on shaft 13 by a pin 27 having one end, as its upper end is pressed into a well in disc 23 and the remainder thereof extending in a close sliding fit through openings in discs 20 and 22 thereby locking these discs together in an area inwardly of the central opening in disc 21. Accordingly, disc 21 is free to rotate relative to the other three discs.

Figure 2:
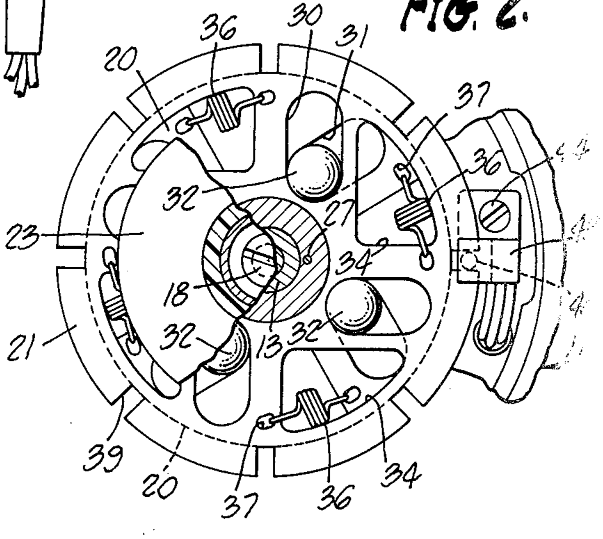
FIG. 2 is a fragmentary cross-sectional view taken along the broken line 2—2 on FIG. 1 showing the components at rest in their fully retracted position.
Figure 3:
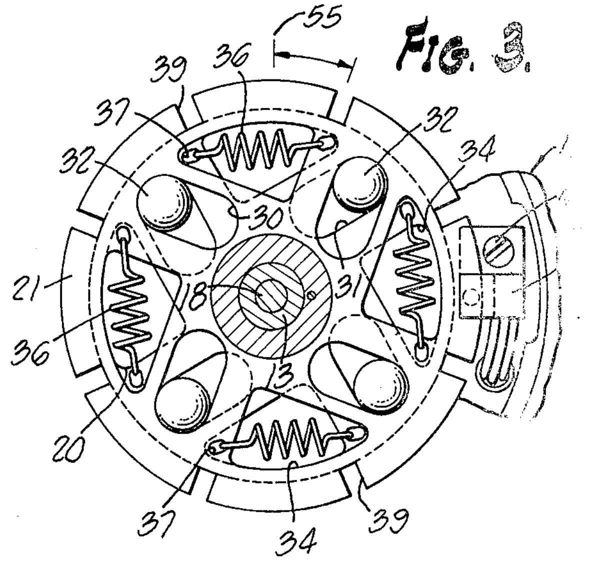
FIG. 3 is a view generally similar to FIG. 2 but showing the centrifugally responsive spark advance components in their normal engine operating position with the spark fully advanced.

Referring to FIGS. 2 and 3, it is pointed out that the discs 20 and 21 are provided with similar sets of oppositely inclined non-radial slots 30, 31 cooperating with the bearing plates 22, 23 to hold a centrifugally responsive ball 32 captive in each set. Although slots 30 and 31 are herein shown as straight they may be of a selected curvilinear shape to provide a desired nonlinear spark advance characteristic. As will be clearly understood from a consideration of FIG. 1, the only contact between one of the balls 32 and slots 30 and 31 occurs in a plane coincident with the interface between discs 20, 21 which lies in a common diametric plane through all four balls 32. This is the most effective and efficient area of contact between the discs and the balls and assures highly precise control of the ignition circuits. Balls 32 are supported between and have free rolling contact with the adjacent surfaces of bearing discs 22, 23 as is clearly evident from FIG. 1.

Each of discs 20, 21 are provided with a generally triangularly shaped cutout 34 between each set of slots each accommodating a calibrated tension spring 36. The opposite ends of these springs are connected one to disc 20 and the other to disc 21 via elongated openings 37 thereby urging these discs to rotate in a direction to position balls 32 at the inner ends of the associated set of slots 30, 31. The accurately calibrated springs may be of the same strength or, alternatively, one or more of the springs may be of different strengths and so designed that discs 20 and 21 have a non-linear rotary characteristic relative to the engine speed. For example, one or more of the springs 36 may be designed to engage the ends of openings 37 so as to oppose outward movement of balls 36 only as the balls approach the outer end of slots 30, 31. In these circumstances the spark advance would be along a non-linear path as respects a linear increase in engine speed. By the same token more than one of the springs 36 can be designed in this manner and with slightly different tension characteristics to obtain any desired characteristic in spark advance and retardation.

Chopper disc 21 is of larger diameter than disc 20 in order that its periphery may be provided with a series of equidistantly spaced notches or openings 39 serving an important function in controlling activation of the separate ignition circuits to each of the spark plugs. These serve to control activation of the spark to the plugs by controlling the passage of a light beam between a light source 40 (FIG. 1) and a light sensor 41. Both the light source, such as a light emitting diode, and the light sensor are rigidly supported in a bracket 43 fixed to the interior of the distributor housing as by a screw 44. Light sensor 41 is suitably connected in known manner to any conventional solid state electronic ignition assembly well known to those skilled in this art but not shown in the present drawing.

Also connected in circuit with these solid state components is the usual distributor rotor 46 having a snug telescopic fit over the upper end 47 of collar 25 integral with disc 23. Rotor 46 is of well known construction having an interlocking fit with the upper notched end of collar 25 and a spring contactor 48 mounted along its upper side with its outer end rotating in closely spaced relation to a separate contactor for each ignition circuit. Each of these contactors is in circuit with a separate conductor connected to the ignition system and seated in one of the tubular nipples 48 molded integral with distributor cap 12. A central nipple 49 has its contactor bearing against the aforementioned contactor secured to the upper side of rotor 46.

Timing adjustment is controlled by a simple manually adjustable clutch interconnecting shaft 13 and the centrifugally responsive spark advance and retarding components. This clutch mechanism includes the tubular collar 25 of disc 23 and a cooperating tubular clutch member 50. The lower end of member 50 includes axial tongues 51 which seat in a groove 52 extending diametrically across the end of shaft 13 so that member 50 is driven by the shaft. The upper end of member 50 is provided with a tapered clutch surface 53 which seats firmly against a complementally tapered surface 54 on the inner side wall of collar 25. Accordingly when assembly cap screw 18 is tightened surfaces 53 and 54 of the clutch are clamped together in any circumferentially oriented position of shaft 13 and the interlocked discs 20, 22 and 23.

Timing can be changed quickly and conveniently merely by detaching cap 12 and rotor 46 and loosening cap screw 18. This frees discs 20, 22 and 23 so that this unitary assembly can be rotated in any desired increment and direction about shaft 13 before relocking this assembly to shaft 13 by retightening screw 18.

The engine is started in the usual manner. Initially, springs 36 hold the upper relatively movable chopper disc 21 in the position shown in FIG. 2 wherein balls 32 are located at the inner ends of slots 30, 31. Under these conditions springs 36 hold the light and ignition control notches 39 rotated counterclockwise by the desired angle of spark retardation.

As the engine starts to rotate, balls 32 tend to move outwardly along slots 30, 31 in response to centrifugal forces thereby causing the chopper disc 21 to rotate clockwise relative to disc 20 fixed to the distributor shaft. As the engine starts balls 32 move toward the outer ends of slots 30, 31 in opposition to springs 36 thereby advancing the spark from the fully retarded position indicated by 55 in FIG. 3 to an engine operating position dependent on engine speed. As soon as the engine stops, springs 36 restore disc 21 to its initial retarded position as balls 32 are forcibly restored to their retracted position at the inner ends of slots 30, 31.

If the distributor shaft is designed to operate in a counterclockwise rather than a clockwise direction, it is merely necessary to turn each of the discs 20, 21 upside down, thereby reversing the direction of inclination of slots 30, 31 relative to one another. The components now operate to advance and retard the spark in the reverse manner to that described above for the clockwise operating condition.

While the particular breakerless ignition converter kit for engine ignition systems herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A breakerless ignition distributor having a shaft adapted to be driven by an internal combustion engine, centrifugally actuated spark advance and retarding means mounted thereon including first, second, third and fourth discs, means including clamping means for clamping said first second and fourth discs against rotary movement relative to said shaft and leaving said third disc free for limited arcuate movement relative to the remainder of said discs and about the axis of said shaft, said second and third discs having sets of slots inclined in opposite directions generally radially thereof and holding captive therein a centrifugally responsive ball operable to rotate said third disc relative to the other of said discs in opposition to spring means interconnecting said third disc and said other discs, and said third disc having a notched periphery rotating in proximity to stationary ignition control sensor means mounted close to the path of said notches.

2. A distributor as defined in claim 1 characterized in that said clamping means includes internesting tapering surfaces coaxially of the end of said shaft effective when clamped together to hold said third disc in a selected position relative to the remainder of said discs thereby to control the timing of said distributor.

3. That improvement in ignition distributors having an engine-driven shaft for controlling activation of the several ignition circuits which comprises: a pair of discs held sandwiched between third and fourth discs by a clamping fastener securable to the outer end of the distributor shaft and effective when tight to clamp all except said second disc against rotation, said second disc having limited freedom of rotation about the axis of said shaft, said first and second discs having sets of elongated slots therein extending at oppositely inclined angles to the radius of said discs and each set cooperating with said third and fourth discs to hold a single ball freely captive therein, spring means biasing said first and second discs to a stationary position when said discs are not rotating with said balls retracted to the inner ends of said slots, the rim portion of said second disc having a separate opening for each engine ignition circuit spaced equidistantly from one another, said openings being rotatable past electrically responsive ignition circuit control means.

4. That improvement defined in claim 3 characterized in that the interface between said first and second discs is substantially coincident with a diametric plane through said balls.

5. That improvement defined in claim 3 characterized in that said spring means comprise a plurality of springs of different strengths.

6. That improvement defined in claim 5 characterized in that said springs are generally of the same construction except formed of resilient stock of different cross-section to have different strength characteristics.

7. That improvement defined in claim 3 characterized in that said spring means comprises a plurality of springs cooperating with an increasing rate of rotation of the distributor shaft to retard activation of the ignition circuits non-linearly.

8. That improvement defined in claim 3 characterized in that said electrically responsive ignition circuit control means includes a light source and light responsive sensor means positioned adjacent the opposite ends of the light path traversed by the openings in said second disc.

9. That improvement defined in claim 3 characterized in that said first and second discs are invertable thereby permitting use of said discs on a distributor shaft driven in either direction.

* * * * *